United States Patent
Zhu (10) Patent No.: US 11,163,196 B2
(45) Date of Patent: Nov. 2, 2021

(54) LCD DISPLAY PANEL

(71) Applicant: TCL CHINA STAR OPTOELECTRONICS TECHNOLOGY CO., LTD., Shenzhen (CN)

(72) Inventor: Qingyong Zhu, Shenzhen (CN)

( * ) Notice: Subject to any disclaimer, the term of this patent is extended or adjusted under 35 U.S.C. 154(b) by 0 days.

(21) Appl. No.: 16/627,307

(22) PCT Filed: Dec. 10, 2019

(86) PCT No.: PCT/CN2019/124410
§ 371 (c)(1),
(2) Date: Dec. 29, 2019

(87) PCT Pub. No.: WO2021/103141
PCT Pub. Date: Jun. 3, 2021

(65) Prior Publication Data
US 2021/0157184 A1     May 27, 2021

(30) Foreign Application Priority Data
Nov. 27, 2019 (CN) .......................... 201911178408.7

(51) Int. Cl.
*G02F 1/1339* (2006.01)
*H01L 51/52* (2006.01)
(Continued)

(52) U.S. Cl.
CPC ........ *G02F 1/1339* (2013.01); *G02F 1/13394* (2013.01); *H01L 51/524* (2013.01);
(Continued)

(58) Field of Classification Search
CPC ............... G02F 1/1339; G02F 1/13394; G02F 2001/13396; H05B 33/04; H01L 51/524; H01L 51/5246
See application file for complete search history.

(56) References Cited

U.S. PATENT DOCUMENTS 8,199,272 B2 * 6/2012 Wang .................... G02F 1/1339 349/53
2010/0265449 A1 * 10/2010 Kira ...................... G02F 1/1339 349/153

(Continued)

FOREIGN PATENT DOCUMENTS

| CN | 102566152 A | 7/2012 |
| CN | 105607350 A | 5/2016 |

(Continued)

OTHER PUBLICATIONS

English translation for JP-2003344863, Hayashi (Year: 2003).*

*Primary Examiner* — Michael H Caley
*Assistant Examiner* — Jonathan Y Jung (57) ABSTRACT

A liquid crystal display (LCD) panel is disclosed. The LCD panel includes a thin film transistor substrate having a display area and a peripheral area; a color filter substrate disposed on the thin film transistor substrate with a distance; and a cross-shaped protrusion disposed on an inner side of the thin film transistor substrate, an inner side of the color filter substrate, or the inner side of the thin film transistor substrate and the inner side of the color filter substrate. The cross-shaped protrusion is located at a corner of the peripheral area. The LCD panel is provided with the cross-shaped protrusion to prevent sealant adhesion resulting in poor cutting.

16 Claims, 4 Drawing Sheets

(51) Int. Cl.
  *G02F 1/1362* (2006.01)
  *H05B 33/04* (2006.01)
  *G02F 1/1368* (2006.01)

(52) U.S. Cl.
  CPC ........ *H01L 51/5246* (2013.01); *G02F 1/1368* (2013.01); *G02F 1/136222* (2021.01); *H05B 33/04* (2013.01)

(56) References Cited

U.S. PATENT DOCUMENTS

| | | | |
|---|---|---|---|
| 2013/0010250 A1 | 1/2013 | Kira | |
| 2014/0138647 A1* | 5/2014 | Moon | H01L 51/5246 257/40 |
| 2015/0346533 A1* | 12/2015 | Park | G02F 1/133512 349/42 |
| 2019/0310500 A1* | 10/2019 | Yamada | G02F 1/13336 |
| 2020/0081301 A1* | 3/2020 | Yang | G02F 1/1339 |

FOREIGN PATENT DOCUMENTS

| | | | |
|---|---|---|---|
| CN | 206209257 U | | 5/2017 |
| CN | 208848018 U | | 5/2019 |
| JP | 2003344863 A | * | 12/2003 |
| KR | 20030005796 A | | 1/2003 |

* cited by examiner

LCD DISPLAY PANEL

CROSS REFERENCE TO RELATED APPLICATIONS

The present application claims priority to Chinese Patent Application No. 201911178408.7, entitled "LCD DISPLAY PANEL", and filed on Nov. 27, 2019, the entire disclosure of which is incorporated herein by reference.

FIELD OF INVENTION

The present disclosure relates to a liquid crystal display (LCD) panel, and in particular, to a narrow bezel LCD panel with a corner of a narrow bezel sealant.

BACKGROUND OF INVENTION

Liquid crystal displays (LCDs) have a variety of advantages, such as thin device body, low power consumption, and no radiation, and thus have wide application ranges. Most of the LCDs currently available in the market are backlight type LCDs, which comprise an LCD panel and a backlight module. The operation principle of the LCD panels is that, with liquid crystal molecules interposed between two parallel glass substrates, application of electricity to the glass substrates is selectively carried out to control and change the directions of the liquid crystal molecules in order to refract light emitted from the backlight module for generating images.

The LCD panels are mainly composed of a color filter (CF), a thin film transistor (TFT), a liquid crystal, and a sealant. The liquid crystal is filled between the color filter and the thin film transistor. The sealant is coated adjacent to the peripheral edges of the color filter and the thin film transistor, so as to connect the color filter with the thin film transistor. Moreover, the sealant is capable of maintaining a thickness of the color filter and the thin film transistor substrate, and achieves the sealing effect to block the liquid crystal molecules from the outside.

Technical Problems

With the market's pursuit of simple and aesthetic display panels, narrow bezels have become the development trend of high-end display panels. In order to meet the requirements of narrow bezels, the width of the sealant for the bezels is greatly reduced, and the accuracy requirements are high. The sealant is coated on the four corners. A reduced cornering radius of the sealant is required to prevent the sealant from affecting the display area. Since a lower limit of the cornering radius of a sealant coating machine is generally 500 um, it cannot meet the coating requirements of the sealant for ultra-narrow bezels. Accordingly, for the ultra-narrow bezel products, it has been tested that the problem of excessive cornering radius of the sealant coating machine may be solved by using the cross coating or circular coating. Finally, the excess sealant is removed by cutting to obtain the narrow bezel products.

However, in the above cutting methods, since the sealant on the four corners is directly cut off, the problems, such as cracking and peeling, are easily caused, due to the adhesion of the sealant.

Accordingly, it is necessary to provide a liquid crystal display (LCD) panel to solve the problems existing in the prior art.

SUMMARY OF INVENTION

Technical Solutions

In view of this, the present disclosure provides an LCD panel to solve the problems relating the adhesion of the sealant in the prior art, resulting in poor cutting, such as cracked corners and peeling.

The main purpose of the present disclosure is to provide an LCD panel, which can prevent the problem of poor cutting caused by directly cutting on the sealant, so as to prevent the overflowing of the sealant to the display area to affect the display effect.

In order to achieve the object of the disclosure mentioned previously, an embodiment of the present disclosure provides a liquid crystal display (LCD) panel, comprising: a thin film transistor substrate having a display area and a peripheral area, wherein the peripheral area is located at a periphery of the display area; a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and a cross-shaped protrusion in a plan view disposed on an inner side of the thin film transistor substrate, an inner side of the color filter substrate, or the inner side of the thin film transistor substrate and the inner side of the color filter substrate, wherein the cross-shaped protrusion is located at a corner of the peripheral area of the thin film transistor substrate and the peripheral area of the color filter substrate, and a height of the cross-shaped protrusion is approximately equal to a height of the substrate space.

In one embodiment of the present disclosure, the cross-shaped protrusion includes a cross-shaped protrusion parent part and a cross-shaped protrusion child part, wherein the cross-shaped protrusion parent part is disposed on the inner side of the thin film transistor substrate, and the cross-shaped protrusion child part is disposed on the inner side of the color filter substrate.

In one embodiment of the present disclosure, the cross-shaped protrusion has a substrate connection portion and an extension portion opposite to each other. The substrate connection portion is connected to the inner side of the thin film transistor substrate or the inner side of the color filter substrate, and the extension portion extends from the substrate connection portion. A cross-section of the extension portion is smaller than a cross-section of the substrate connection portion.

In one embodiment of the present disclosure, the LCD panel further comprises a barrier wall disposed on the inner side of the thin film transistor substrate, the inner side of the color filter substrate, or the inner side of the thin film transistor substrate and the inner side of the color filter substrate. The barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

In one embodiment of the present disclosure, the barrier wall comprises a barrier wall parent part and a barrier wall child part, wherein the barrier wall parent part is disposed on the inner side of the thin film transistor substrate, and the barrier wall child part is disposed on the inner side of the color filter substrate.

Another embodiment of the present disclosure provides a liquid crystal display panel, comprising: a thin film transistor substrate having a display area and a peripheral area, wherein the peripheral area is located at a periphery of the display area; a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and a cross-shaped protrusion in a plan view disposed on an inner side of the thin film transistor substrate, an inner side of the color filter substrate, or the inner side of the thin film transistor substrate and the inner side of the color filter substrate, wherein the cross-shaped protrusion is located at a corner of the peripheral area of the thin film transistor substrate and the peripheral area of the color filter substrate, the cross-shaped protrusion is a single-layer structure or a multi-layer structure, and the cross-shaped protrusion is selected from one or more of the group consisting of a color filter layer, a protective film, and a gap layer.

In one embodiment of the present disclosure, the cross-shaped protrusion includes a cross-shaped protrusion parent part and a cross-shaped protrusion child part, wherein the cross-shaped protrusion parent part is disposed on the inner side of the thin film transistor substrate, and the cross-shaped protrusion child part is disposed on the inner side of the color filter substrate.

In one embodiment of the present disclosure, the cross-shaped protrusion has a substrate connection portion and an extension portion opposite to each other. The substrate connection portion is connected to the inner side of the thin film transistor substrate or the inner side of the color filter substrate, and the extension portion extends from the substrate connection portion. A cross-section of the extension portion is smaller than a cross-section of the substrate connection portion.

In one embodiment of the present disclosure, the LCD panel further comprises a barrier wall disposed on the inner side of the thin film transistor substrate, the inner side of the color filter substrate, or the inner side of the thin film transistor substrate and the inner side of the color filter substrate. The barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

In one embodiment of the present disclosure, the barrier wall comprises a barrier wall parent part and a barrier wall child part, wherein the barrier wall parent part is disposed on the inner side of the thin film transistor substrate, and the barrier wall child part is disposed on the inner side of the color filter substrate.

Another embodiment of the present disclosure provides a liquid crystal display panel, comprising: a thin film transistor substrate having a display area and a peripheral area, wherein the peripheral area is located at a periphery of the display area; a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and a cross-shaped protrusion in a plan view disposed on an inner side of the thin film transistor substrate, an inner side of the color filter substrate, or the inner side of the thin film transistor substrate and the inner side of the color filter substrate, and the cross-shaped protrusion is located at a corner of the peripheral area of the thin film transistor substrate and the peripheral area of the color filter substrate.

In one embodiment of the present disclosure, a width of the cross-shaped protrusion ranges from 50 to 200 um.

In one embodiment of the present disclosure, the cross-shaped protrusion includes a cross-shaped protrusion parent part and a cross-shaped protrusion child part, wherein the cross-shaped protrusion parent part is disposed on the inner side of the thin film transistor substrate, and the cross-shaped protrusion child part is disposed on the inner side of the color filter substrate.

In one embodiment of the present disclosure, the cross-shaped protrusion has a substrate connection portion and an extension portion opposite to each other. The substrate connection portion is connected to the inner side of the thin film transistor substrate or the inner side of the color filter substrate, and the extension portion extends from the substrate connection portion. A cross-section of the extension portion is smaller than a cross-section of the substrate connection portion.

In one embodiment of the present disclosure, the LCD panel further comprises a barrier wall disposed on the inner side of the thin film transistor substrate, the inner side of the color filter substrate, or the inner side of the thin film transistor substrate and the inner side of the color filter substrate. The barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

In one embodiment of the present disclosure, a width of the barrier wall ranges from 10 to 100 um.

In one embodiment of the present disclosure, the barrier wall comprises a barrier wall parent part and a barrier wall child part, wherein the barrier wall parent part is disposed on the inner side of the thin film transistor substrate, and the barrier wall child part is disposed on the inner side of the color filter substrate.

In one embodiment of the present disclosure, the barrier wall corresponds to the corner and has an L-shaped structure.

In one embodiment of the present disclosure, the barrier wall has a substrate connection portion and an extension portion opposite to each other. The substrate connection portion is connected to the inner side of the thin film transistor substrate or the inner side of the color filter substrate, and the extension portion extends from the substrate connection portion. A cross-section of the extension portion is smaller than a cross-section of the substrate connection portion.

Beneficial Effects

Compared with the prior art, by the design of the cross-shaped protrusion, the LCD panel of the present disclosure prevents the problem of poor cutting caused by the adhesion of the sealant on the cutting lines at the intersections, and prevents the problem of poor display effect resulting from the sealant on the corners overflowing to the display area. In summary, without any change of the process, the coating problem of the sealant on the corners of the ultra-narrow bezel is solved.

To make the above description of the present disclosure more clearly comprehensible, it is described in detail below in examples of preferred embodiments with the accompanying drawings.

DETAILED DESCRIPTION OF EMBODIMENTS

The following embodiments are referring to the accompanying drawings for exemplifying specific implementable embodiments of the present disclosure. Furthermore, directional terms described by the present disclosure, such as "upper", "lower", "top", "front", "back", "left", "right", "inner", "outer", "side", "around", "center", "horizontal", "lateral", "vertical", "longitudinal", "axial", "radial", "uppermost" or "lowermost", etc., are only directions by referring to the accompanying drawings. Thus, the used directional terms are used to describe and understand the present disclosure, but the present disclosure is not limited thereto.

Figure 1:
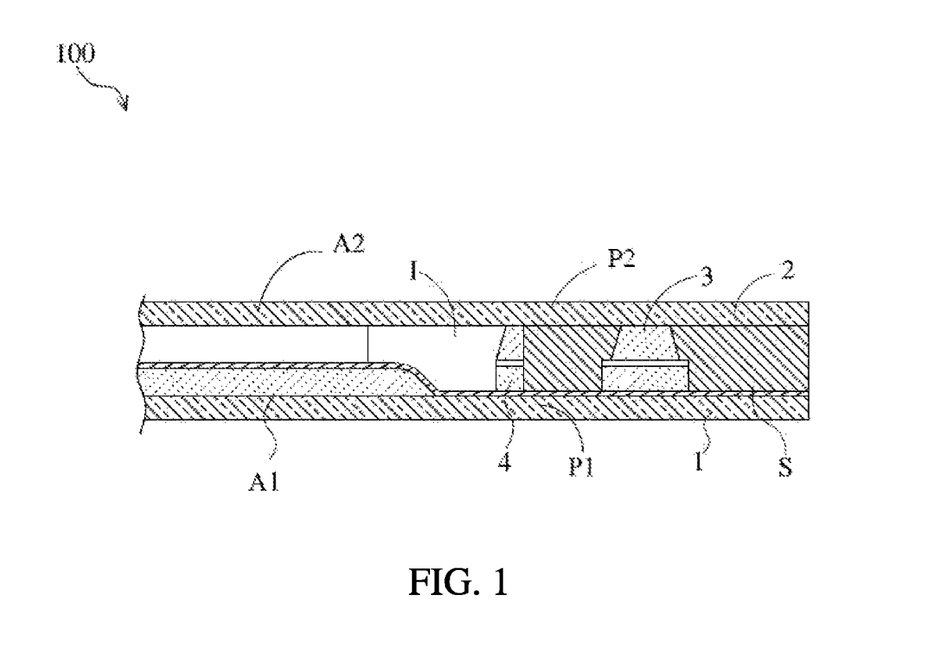
FIG. 1 is a schematic cross-sectional view of a cross-shaped protrusion and a barrier wall provided between a thin film transistor substrate and a color filter substrate of an LCD panel according to an embodiment of the present disclosure.
Figure 2:
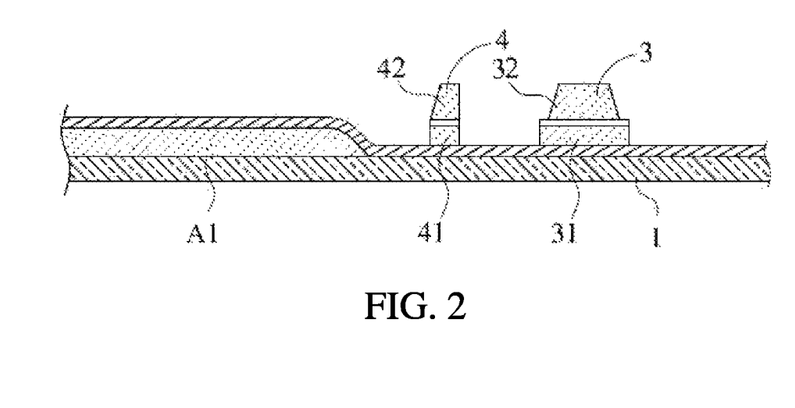
FIG. 2 is a schematic cross-sectional view of a cross-shaped protrusion and a barrier wall provided on a thin film transistor substrate of an LCD panel according to an embodiment of the present disclosure.
Figure 4:
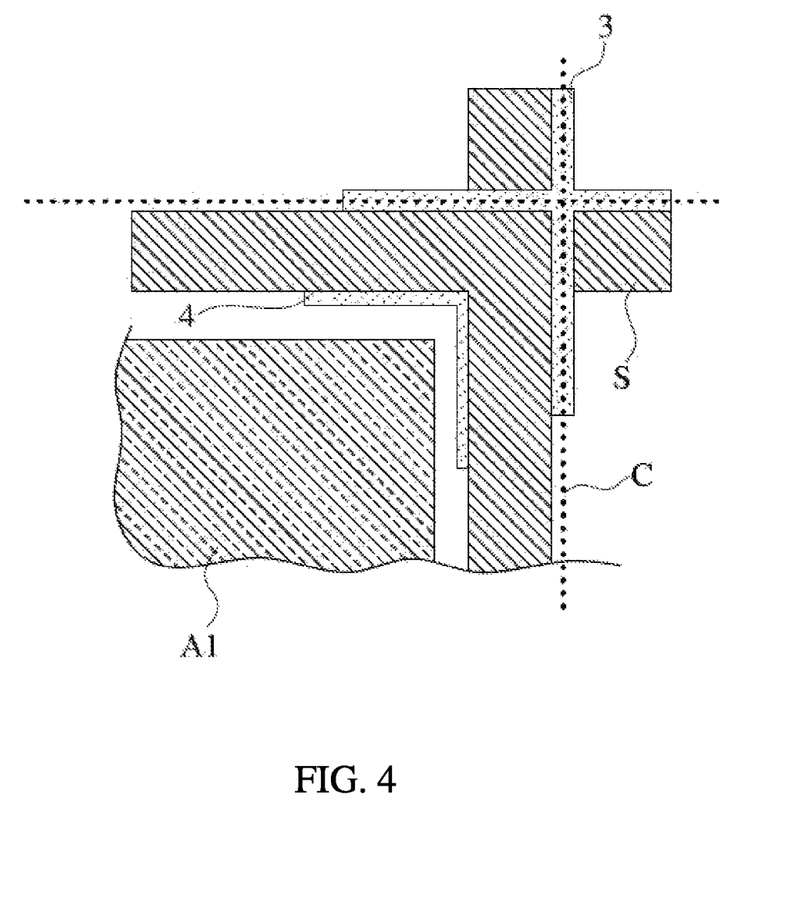
FIG. 4 is a schematic plan view of a cutting line provided on a cross-shaped protrusion of an LCD panel of the present disclosure.

Please refer to FIGS. 1, 2 and 4, a liquid crystal display (LCD) panel 100 according to an embodiment of the present disclosure includes a thin film transistor substrate 1, a color filter substrate 2, and a cross-shaped protrusion 3.

The thin film transistor substrate 1 has a display area A1 and a peripheral area P1, wherein the peripheral area P1 is located around a periphery of the display area A1.

The color filter substrate 2 is disposed on the thin film transistor substrate 1 with a distance, wherein the color filter substrate 2 has a display area A2 and a peripheral area P2 corresponding to the display area A1 and the peripheral area P1 of the thin film transistor substrate 1, respectively, and a substrate space I is formed between the thin film transistor substrate 1 and the color filter substrate 2.

The cross-shaped protrusion 3 is disposed on an inner side of the thin film transistor substrate 1, and the cross-shaped protrusion 3 is located at a corner of the peripheral area P1 of the thin film transistor substrate 1 and the peripheral area P2 of the color filter substrate 2.

Specifically, the cross-shaped protrusion 3 may be a single-layer structure or a multi-layer structure, and is selected from one or more of the group consisting of a color filter layer, a protective film, and a gap layer. As shown in FIG. 2, the cross-shaped protrusion 3 has a substrate connection portion 31 and an extension portion 32 opposite each other. The substrate connection portion 31 is connected to the inner side of the thin film transistor substrate 1. Alternatively, in other embodiments, the substrate connection portion 31 is connected to the inner side of the color filter substrate. The extension portion 32 extends from the substrate connection portion 31, and a cross-section of the extension portion 32 is smaller than a cross-section of the substrate connection portion 31. Moreover, a height of the cross-shaped protrusion 3 is approximately equal to a height of the substrate space I. A width of the cross-shaped protrusion 3 ranges from 50 to 200 um. Preferably, the width of the cross-shaped protrusion 3 ranges from 80 to 100 um. More preferably, the width of the cross-shaped protrusion 3 ranges 90 to 95 um.

The present disclosure is not limited to this. As shown in FIG. 4, a cross-shaped protrusion 3' may be provided on the inner side of the thin film transistor substrate 1 and the inner side of the color filter substrate 2, respectively. The cross-shaped protrusion includes a cross-shaped protrusion parent part 31' and a cross-shaped protrusion child part 32', wherein the cross-shaped protrusion parent part 31' is disposed on the inner side of the thin film transistor substrate 1, and the cross-shaped protrusion child part 32' is disposed on the inner side of the color filter substrate 2. When the thin film transistor substrate 1 and the color filter substrate 2 are bonded together, the cross-shaped protrusion parent part 31' abuts the cross-shaped protrusion child part 32'.

Preferably, the LCD panel 100 further comprises a barrier wall 4 disposed on the inner side of the thin film transistor substrate 1. The barrier wall 4 is located at a corner of the peripheral area P1 of the thin film transistor substrate 1 and the peripheral area P2 of the color filter substrate 2, and is located between the cross-shaped protrusion 3 and the display area A1 of the thin film transistor substrate 1 and the display area A2 of the color filter substrate 2.

Specifically, the barrier wall 4 is a single-layer structure or a multi-layer structure, and is selected from one or more of the group consisting of a color filter layer, a protective film, and a gap layer. As shown in FIG. 4, the barrier wall 4 corresponds to the corner and has an L-shaped structure. As shown in FIG. 2, the barrier wall 4 has a substrate connection portion 41 and an extension portion 42 opposite each other, wherein the substrate connection portion 41 is connected to the inner side of the thin film transistor substrate. Alternatively, in other embodiments, the substrate connection portion is connected to the inner side of the color filter substrate. The extension portion 42 extends from the substrate connection portion 41, and a cross-section of the extension portion 42 is smaller than a cross-section of the substrate connection portion 41. Preferably, a height of the barrier wall 4 is approximately equal to a height of the substrate space I. A width of the barrier wall 4 ranges from 10 to 100 um. Preferably, the width of the barrier wall 4 ranges from 20 to 80 um. More preferably, the width of the barrier wall 4 ranges from 30 to 70 um.

Figure 3:
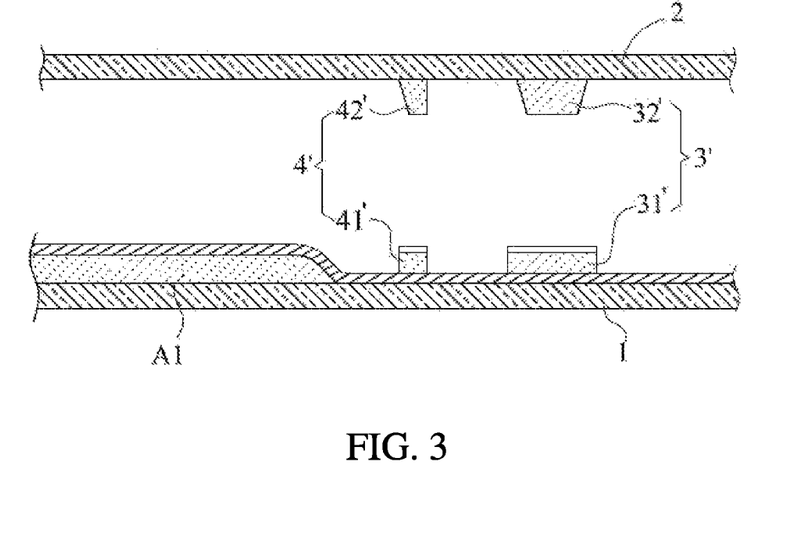
FIG. 3 is a schematic cross-sectional view of a cross-shaped protrusion and a barrier wall respectively provided on a thin film transistor substrate and a color filter substrate of an LCD panel according to another embodiment of the present disclosure.

The present disclosure is not limited to this. As shown in FIG. 3, the barrier wall 4 comprises a barrier wall parent part 41' and a barrier wall child part 42', wherein the barrier wall parent part 41' is disposed on the inner side of the thin film transistor substrate 1, and the barrier wall child part 42' is disposed on the inner side of the color filter substrate 2. When the thin film transistor substrate 1 and the color filter substrate 2 are bonded together, the barrier wall parent part 41' abuts the barrier wall child part 42'.

As shown in FIGS. 1 and 4, the cutting may be performed on the attached thin film transistor substrate 1 and the color filter substrate 2 along a cutting line C on the cross-shaped protrusion 3 to remove the sealant S on the outer side of the cross-shaped protrusion 3, so that the problem of poor cutting due to adhesion may be prevented.

The present disclosure has been described in relative embodiments described above. However, the above embodiments are merely examples of performing the present disclosure. It must be noted that the implementation of the disclosed embodiments does not limit the scope of the disclosure. On the contrary, modifications and equal settings included in the spirit and scope of the claims are all included in the scope of the present disclosure.

What is claimed is:

1. A liquid crystal display (LCD) panel, comprising:
a thin film transistor substrate having a display area and a peripheral area, wherein the peripheral area is located at a periphery of the display area;
a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and
a cross-shaped protrusion in a plan view disposed on an inner side of the thin film transistor substrate, an inner side of the color filter substrate, or the inner side of the thin film transistor substrate and the inner side of the color filter substrate, wherein the cross-shaped protrusion is located at a corner of the peripheral area of the thin film transistor substrate and the peripheral area of the color filter substrate, and a height of the cross-shaped protrusion is approximately equal to a height of the substrate space;
wherein the cross-shaped protrusion in a plan view has a substrate connection portion and an extension portion opposite to each other, the substrate connection portion is connected to the inner side of the thin film transistor substrate or the inner side of the color filter substrate, the extension portion extends from the substrate connection portion, and a cross-section of the extension portion is smaller than a cross-section of the substrate connection portion.

2. The LCD panel of claim 1, wherein the cross-shaped protrusion includes a cross-shaped protrusion parent part and a cross-shaped protrusion child part, the cross-shaped protrusion parent part is disposed on the inner side of the thin film transistor substrate, and the cross-shaped protrusion child part is disposed on the inner side of the color filter substrate.

3. The LCD panel claim 1, wherein the LCD panel further comprises a barrier wall disposed on the inner side of the thin film transistor substrate, the inner side of the color filter substrate, or the inner side of the thin film transistor substrate and the inner side of the color filter substrate, the barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

4. The LCD panel of claim 3, wherein the barrier wall comprises a barrier wall parent part and a barrier wall child part, the barrier wall parent part is disposed on the inner side of the thin film transistor substrate, and the barrier wall child part is disposed on the inner side of the color filter substrate.

5. A liquid crystal display (LCD) panel, comprising:
a thin film transistor substrate having a display area and a peripheral area, wherein the peripheral area is located at a periphery of the display area;
a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and
a cross-shaped protrusion in a plan view disposed on an inner side of the thin film transistor substrate, an inner side of the color filter substrate, or the inner side of the thin film transistor substrate and the inner side of the color filter substrate, wherein the cross-shaped protrusion is located at a corner of the peripheral area of the thin film transistor substrate and the peripheral area of the color filter substrate, the cross-shaped protrusion is a single-layer structure or a multi-layer structure, and the cross-shaped protrusion is selected from one or more of the group consisting of a color filter layer, a protective film, and a gap layer;
wherein the cross-shaped protrusion in a plan view has a substrate connection portion and an extension portion opposite to each other, the substrate connection portion is connected to the inner side of the thin film transistor substrate or the inner side of the color filter substrate, the extension portion extends from the substrate connection portion, and a cross-section of the extension portion is smaller than a cross-section of the substrate connection portion.

6. The LCD panel of claim 5, wherein the cross-shaped protrusion includes a cross-shaped protrusion parent part and a cross-shaped protrusion child part, the cross-shaped protrusion parent part is disposed on the inner side of the thin film transistor substrate, and the cross-shaped protrusion child part is disposed on the inner side of the color filter substrate.

7. The LCD panel of claim 5, wherein the LCD panel further comprises a barrier wall disposed on the inner side of the thin film transistor substrate, the inner side of the color filter substrate, or the inner side of the thin film transistor substrate and the inner side of the color filter substrate, the barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

8. The LCD panel of claim 7, wherein the barrier wall comprises a barrier wall parent part and a barrier wall child part, the barrier wall parent part is disposed on the inner side of the thin film transistor substrate, and the barrier wall child part is disposed on the inner side of the color filter substrate.

9. A liquid crystal display (LCD) panel, comprising:
a thin film transistor substrate having a display area and a peripheral area, wherein the peripheral area is located at a periphery of the display area;
a color filter substrate disposed on the thin film transistor substrate, wherein the color filter substrate has a display area and a peripheral area corresponding to the display area and the peripheral area of the thin film transistor substrate, respectively, and a substrate space is formed between the thin film transistor substrate and the color filter substrate; and
a cross-shaped protrusion in a plan view disposed on an inner side of the thin film transistor substrate, an inner side of the color filter substrate, or the inner side of the thin film transistor substrate and the inner side of the color filter substrate, and the cross-shaped protrusion is located at a corner of the peripheral area of the thin film transistor substrate and the peripheral area of the color filter substrate;

wherein the cross-shaped protrusion in a plan view has a substrate connection portion and an extension portion opposite to each other, the substrate connection portion is connected to the inner side of the thin film transistor substrate or the inner side of the color filter substrate, the extension portion extends from the substrate connection portion, and a cross-section of the extension portion is smaller than a cross-section of the substrate connection portion.

10. The LCD panel of claim 9, wherein a width of the cross-shaped protrusion ranges from 50 to 200 um.

11. The LCD panel of claim 9, wherein the cross-shaped protrusion includes a cross-shaped protrusion parent part and a cross-shaped protrusion child part, the cross-shaped protrusion parent part is disposed on the inner side of the thin film transistor substrate, and the cross-shaped protrusion child part is disposed on the inner side of the color filter substrate.

12. The LCD panel of claim 9, wherein the LCD panel further comprises a barrier wall disposed on the inner side of the thin film transistor substrate, the inner side of the color filter substrate, or the inner side of the thin film transistor substrate and the inner side of the color filter substrate, the barrier wall is located at a corner of the peripheral area of the thin film transistor substrate and the peripheral area of the color filter substrate, and the barrier wall is located between the cross-shaped protrusion and the display area of the thin film transistor substrate and the display area of the color filter substrate.

13. The LCD panel of claim 12, wherein a width of the barrier wall ranges from 10 to 100 um.

14. The LCD panel of claim 12, wherein the barrier wall comprises a barrier wall parent part and a barrier wall child part, the barrier wall parent part is disposed on the inner side of the thin film transistor substrate, and the barrier wall child part is disposed on the inner side of the color filter substrate.

15. The LCD panel of claim 12, wherein the barrier wall corresponds to the corner and has an L-shaped structure.

16. The LCD panel of claim 12, wherein the barrier wall has a substrate connection portion and an extension portion opposite to each other, the substrate connection portion is connected to the inner side of the thin film transistor substrate or the inner side of the color filter substrate, the extension portion extends from the substrate connection portion, and a cross-section of the extension portion is smaller than a cross-section of the substrate connection portion.

* * * * *